US012687278B1

(12) United States Patent
Cui et al.

(10) Patent No.: US 12,687,278 B1
(45) Date of Patent: Jul. 21, 2026

(54) STARRY SKY LIGHT SOURCE ASSEMBLY WITH FLASHING DIAL

(71) Applicants: Zijian Cui, Guangzhou (CN); Jiaping Tang, Guangzhou (CN)

(72) Inventors: Zijian Cui, Guangzhou (CN); Jiaping Tang, Guangzhou (CN)

( * ) Notice: Subject to any disclaimer, the term of this patent is extended or adjusted under 35 U.S.C. 154(b) by 0 days.

(21) Appl. No.: 19/404,025

(22) Filed: Dec. 1, 2025

(51) Int. Cl.
*F21V 14/00* (2018.01)
*F21S 10/00* (2006.01)
*F21V 15/01* (2006.01)
*F21V 23/00* (2015.01)

(52) U.S. Cl.
CPC ............ *F21V 14/006* (2013.01); *F21S 10/00* (2013.01); *F21V 15/01* (2013.01); *F21V 23/006* (2013.01)

(58) Field of Classification Search
CPC ...... F21V 14/006; F21V 15/01; F21V 23/006; F21V 14/06; F21V 14/08; F21V 14/085; F21V 14/065; F21V 14/00; F21S 10/00; F21S 10/007; F21S 10/06
See application file for complete search history.

(56) References Cited

U.S. PATENT DOCUMENTS 11,543,091 B1 * 1/2023 Lu .......................... G09F 13/06
11,585,492 B1 * 2/2023 Pang ......................... F21V 9/00
2020/0025355 A1 * 1/2020 Whitmore ................. G01S 5/16

* cited by examiner

*Primary Examiner* — Bao Q Truong

(57) ABSTRACT

A starry sky light source assembly includes an optical machine box including a surrounding wall group (3) with one or more starry light outlets (301) being provided on a first side wall of the surrounding wall group (3), and one or more meteor light outlets (302) being provided on a second side wall of the surrounding wall group (3); a control circuit board (2), a meteor light source assembly (4), one or more starry light source assemblies (5), a rotating assembly (6), and a flashing dial (7) are mounted in the optical machine box. The flashing dial (7) is located in the inner space, connected to the rotating assembly (6) and is rotated by the rotating assembly (6).

15 Claims, 11 Drawing Sheets

STARRY SKY LIGHT SOURCE ASSEMBLY WITH FLASHING DIAL

TECHNICAL FIELD

The present application relates to the field of environmental lighting, particularly to a starry sky light source assembly.

BACKGROUND

Starry sky light source assemblies create environmental lighting with colorful starry sky and fleeting shooting stars, typical application scenarios include indoor starry sky roofs, or outdoor landscape fiber optic decoration.

Currently, starry sky light source assemblies are too large in volume, which limits their applications in car starry sky roofs, for example, when used in car, a starry sky light source assembly can only be placed in the trunk of the car, this increasing a distance between the starry sky light source assembly and a car starry sky roof, resulting an attenuated light intensity.

Therefore, a more integrated starry sky light source assembly with more colorful is needed.

SUMMARY

A starry sky light source assembly comprises an optical machine box comprising a bottom, a surrounding wall group detachably mounted on the bottom, and a cover detachably mounted on the surrounding wall group; the surrounding wall group forming an inner space on the bottom, one or more starry light outlets being provided on at least one side wall of the surrounding wall group, one or more meteor light outlets being provided on another side wall of the surrounding wall group, and the starry light outlets and meteor light outlets being in communication with the inner space;

- a control circuit board detachably mounted on the bottom within the inner space;
- a meteor light source assembly detachably mounted within the inner space, and being electrically connected to the control circuit board;
- one or more starry light source assemblies detachably mounted within the inner space, and being electrically connected to the control circuit board;
- a rotating assembly electrically connected to the control circuit board and being rotatable within the inner space; and
- a flashing dial located in the inner space, connected to the rotating assembly and being rotated by the rotating assembly.

In one embodiment, the optical machine box is less than 35 mm in height, and the bottom, the surrounding wall group and the cover are detachably mounted by screws.

In one embodiment, the optical machine box is less than 35 mm in height, and the bottom, the surrounding wall group and the cover are detachably mounted by screws.

In one embodiment, the one or more starry light outlets are provided on a first side wall of the surrounding wall group, the one or more meteor light outlets are provided on a second side wall of the surrounding wall group, and the first side wall is opposite to the second side wall.

In one embodiment, the one or more starry light outlets comprises a plurality of starry light outlets, one or more of the plurality of starry light outlets are provided on a first side wall of the surrounding wall group, the other one or more of the plurality of starry light outlets are provided on an opposite second side wall of the surrounding wall group, the one or more meteor light outlets are provided on a third side wall of the surrounding wall group.

In one embodiment, the one or more starry light outlets comprises four starry light outlets arranged uniformly on the first side wall, and the one or more meteor light outlets comprises twelve meteor light outlets arranged uniformly on the second side wall.

In one embodiment, the rotating assembly comprises a motor, an output shaft and a connecting plate, and the flashing dial is detachably mounted on an end of the output shaft and detachably connected to the connecting plate.

In one embodiment, the flashing dial comprises a peripheral side wall and a concave portion concaved from a bottom of the peripheral side wall along a height direction thereof, and the flashing dial is mounted on the end of the output shaft and connected to the connecting plate by the concave portion.

In one embodiment, a plurality of holes are formed in a peripheral side wall of the flashing dial, the holes are of different shapes and different sizes, when the flashing dial is rotated, the holes create flickering light and dark.

In one embodiment, the one or more starry light source assemblies comprises a plurality of starry light source assemblies mounted on the bottom within the concave portion, and the starry light source assemblies face the peripheral side wall of the flashing dial, light emitted from the starry light source assemblies transmits through the holes, and then transmits out from the starry light outlets.

In one embodiment, an optical fiber assembly is mounted in one of the starry light outlets for transmitting light emitted from the one or more starry light source assemblies to outside to create nebula and starry sky.

In one embodiment, the flashing dial rotates around an axis perpendicular to the bottom (1) of the optical machine box.

In one embodiment, each starry light source assembly comprises a holder, a starry light source panel mounted on the holder, a light bulb mounted on the starry light source panel, and a reflecting cup mounted outside of the light bulb.

Compared to existing technologies, the technical effects and advantages are the following:

1. Reduce a height of the body of the starry sky light source assembly with a flashing dial, allowing it to be installed on the roof of a car or other narrow spaces, this can reduce the distance between the starry sky light source assembly and the roof, decrease the amount of optical fiber used, and also reduce light attenuation.
2. The present starry sky light source assembly integrates the starry light source assembly and meteor light source assembly into one box in such a thin and flat space, further reducing costs for users.
3. The present starry sky light source assembly have one or more starry light source assemblies which can be independently control to emit light in different colors, so the light transmitted out through the starry light outlets can have different colors.
4. The flashing dial rotates around an axis perpendicular to the bottom of the optical machine box, the flashing dial is rotatably mounted with a height thereof being the minimum size direction, so the height of the optical machine box can be reduced, and the flashing dial rotates in a direction substantially parallel with side walls of the surrounding wall group provided with a plurality of starry light outlets to create a particular transverse light and dark effect. That is, the flashing dial rotates around an axis perpendicular to the bottom of the optical machine box, viewed from the surrounding wall group, the flashing dial likewise rotates transversely relative to the side walls of the surrounding wall group.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DRAWING REFERENCES

Figure 1:
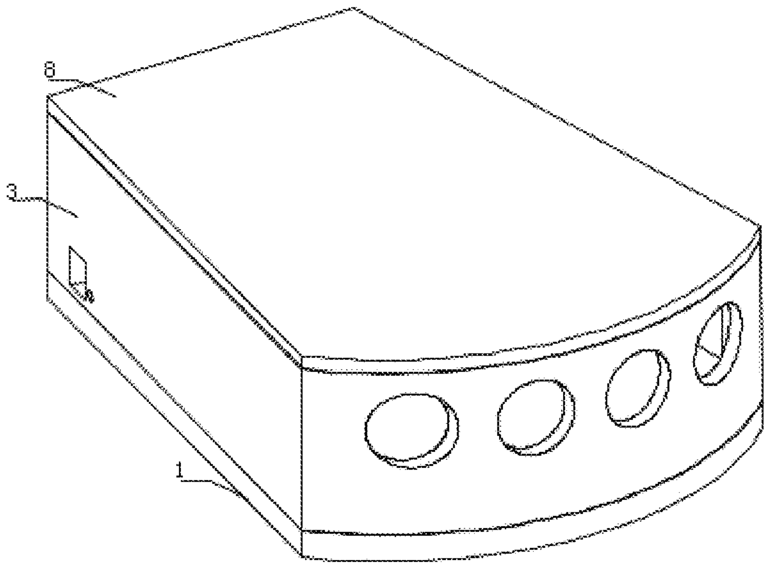
FIG. 1 is a schematic view of a starry sky light source assembly according to an embodiment of the present disclosure.

References: bottom 1; first screw 101; control circuit board 2; surrounding wall group 3; starry light outlet 301; meteor light outlet 302; meteor light source assembly 4; starry light source assembly 5; holder 501; light source panel 502; light bulb 503; reflecting cup 504; rotating assembly 6; motor 601; connecting plate 602; screw hole 603; mounting plate 604; screw 605; flashing dial 7; holes 701, 702; concave portion 703; cover 8; positioning member 9; second screw 801; third screw 802.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

In order to make the above objectives, features, and advantages of the present application more obvious and understandable, the following will provide further detailed explanations of the present application in conjunction with the accompanying drawings and specific implementation methods.

Figure 2:
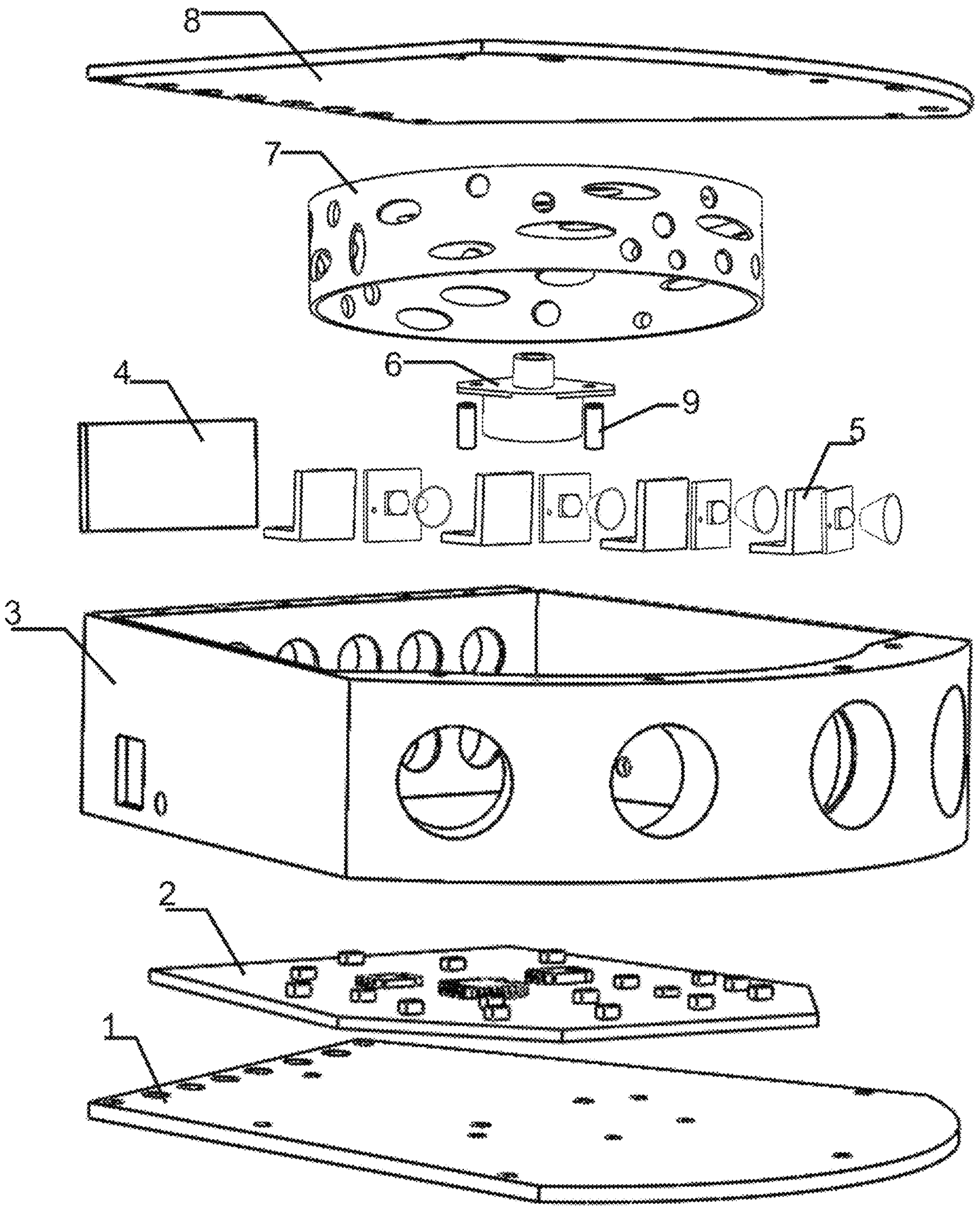
FIG. 2 is an exploded view of a starry sky light source assembly according to an embodiment of the present disclosure.
Figure 9:
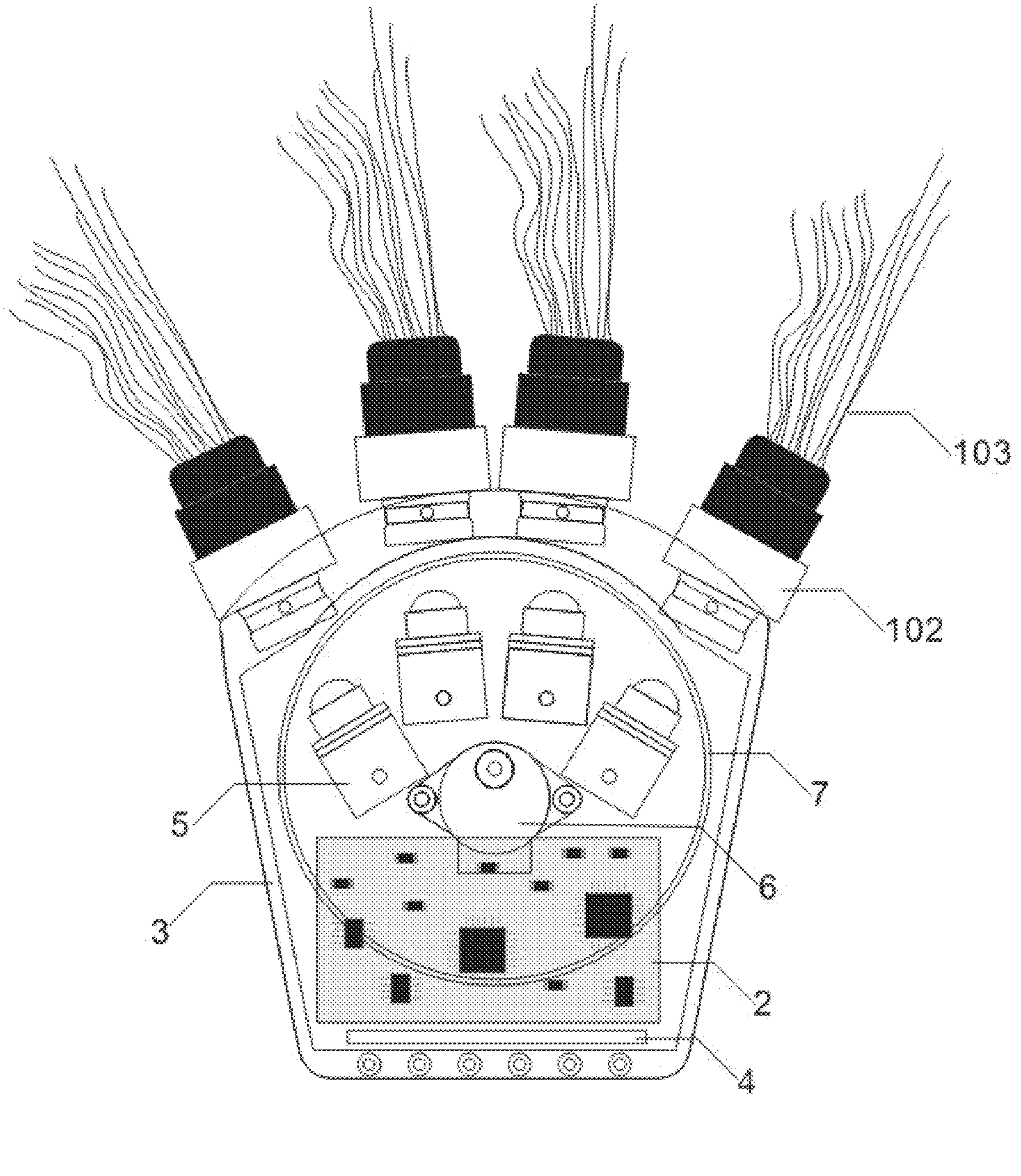
FIG. 9 is a schematic plan view showing inner structures of the starry light source assembly after the cover is removed.

Referring to FIGS. 1-2 and FIG. 9, a starry sky light source assembly includes an optical machine box including a bottom 1, a surrounding wall group 3 formed by connecting a plurality of side walls end to end in sequence, a cover 8. The starry sky light source assembly further includes a control circuit board 2 detachably arranged on the bottom 1; a meteor light source assembly 4; a starry light source assembly 5; a rotating assembly 6; and a flashing dial 7.

The surrounding wall group 3 is connected to the bottom 1 by a first screw 101, and the surrounding wall group 3 forms an inner space on the bottom 1. A front side wall of the surrounding wall group 3 is provided with one or more starry light outlets 301, and a back wall of the surrounding wall group 3 is provided with one or more meteor light outlets 302. In present embodiment, the front side wall is curved in shape.

The meteor light source assembly 4 is detachably connected to an inner side (see FIG. 9) of the surrounding wall group 3 and faces the one or more meteor light outlets 302, and the meteor light source assembly 4 is electrically connected to the control circuit board 2.

The starry light source assembly 5 is detachably connected on the bottom 1, and the starry light source assembly 5 is electrically connected to the control circuit board 2. Specially, the starry light source assembly 5 includes a holder 501, a starry light source panel 502 mounted on the holder 501, a light bulb 503 mounted on the starry light source panel 502, and an optical element 504 mounted outside of the light bulb 503. The optical element 504 can be a reflecting cup 504 or a lens module comprising at least one convex lens.

The rotating assembly 6 (described below) is positioned on the bottom 1, and electrically connected to the control circuit board 2, the rotating assembly 6 is rotatable within the inner space within the surrounding wall group 3.

The flashing dial 7 (described below) is fixed on the rotating assembly 6, preferably, on an end of the rotating assembly 6.

The cover 8 is detachably connected to the surrounding wall group 3 through a second screw 801 and a third screw 802.

The bottom 1, the surrounding wall group 3 and the cover 8 are detachably connected to form the optical machine box, with a height less than 35 mm, decreasing a mounting space for the starry sky light source assembly.

Figure 3:
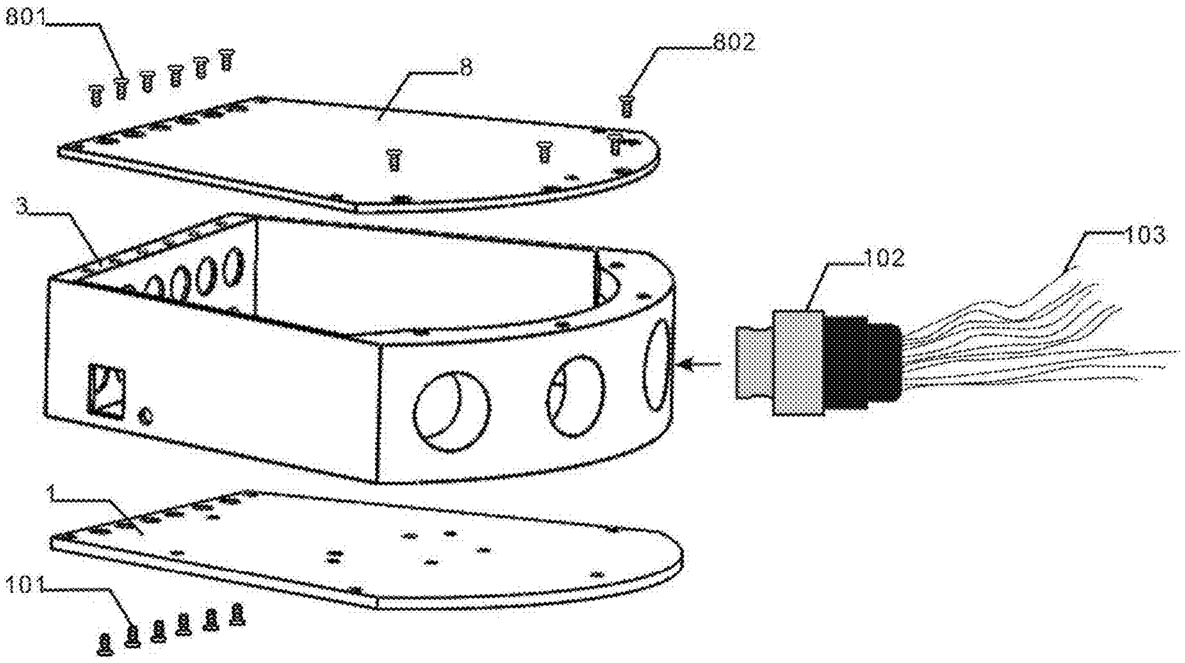
FIG. 3 is a partially exploded view of a starry sky light source assembly according to an embodiment of the present disclosure.
Figure 4:
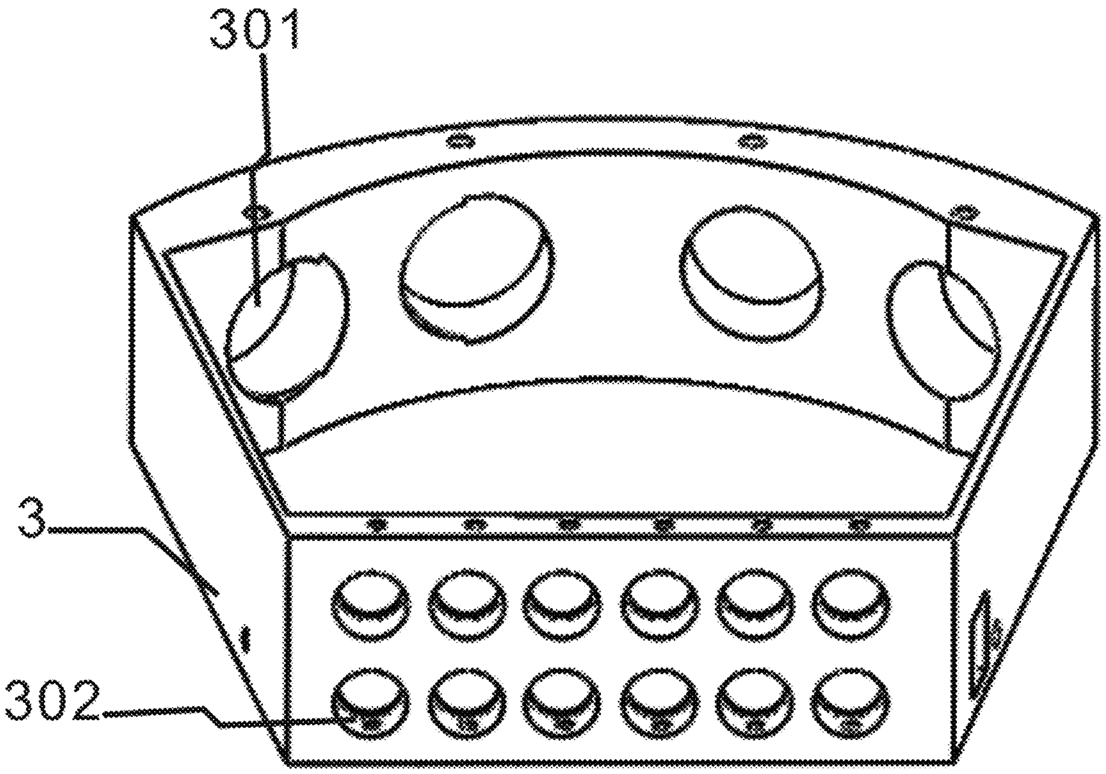
FIG. 4 shows the surrounding wall group of the optical machine box according to an embodiment of the present disclosure.
Figure 5:
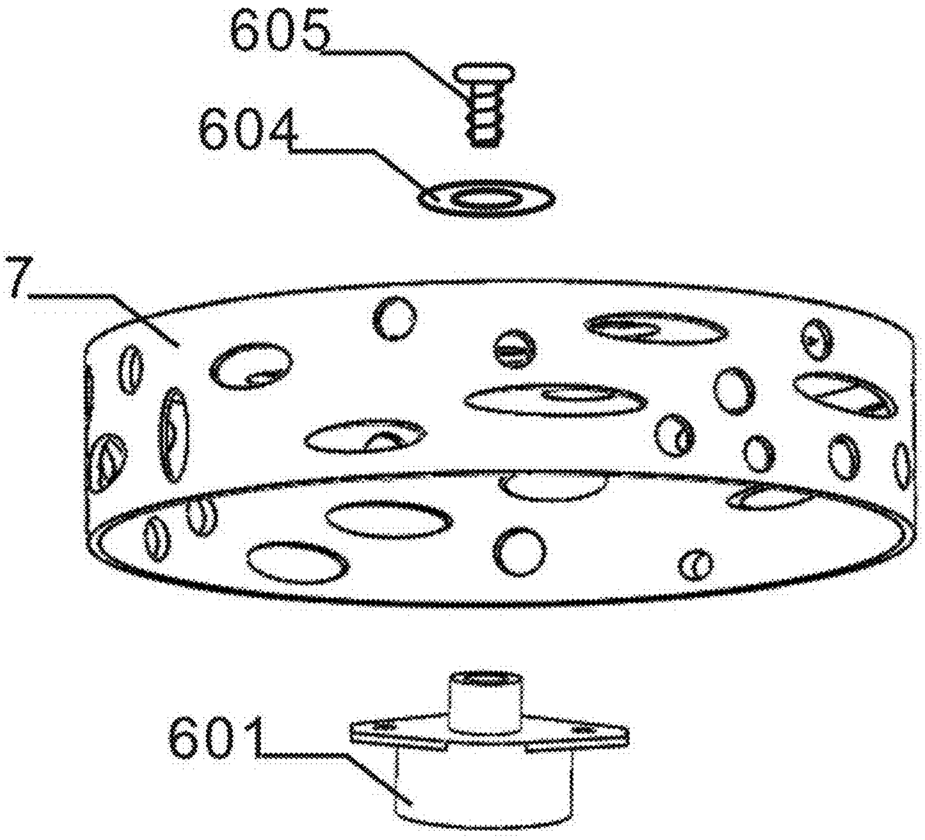
FIG. 5 is a schematic view of the rotating assembly and the flashing dial according to an embodiment of the present disclosure.
Figure 6:
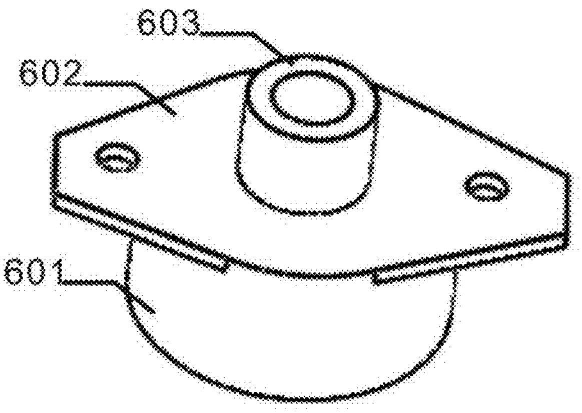
FIG. 6 is an enlarged view of the rotating assembly according to an embodiment of the present disclosure.
Figure 7:
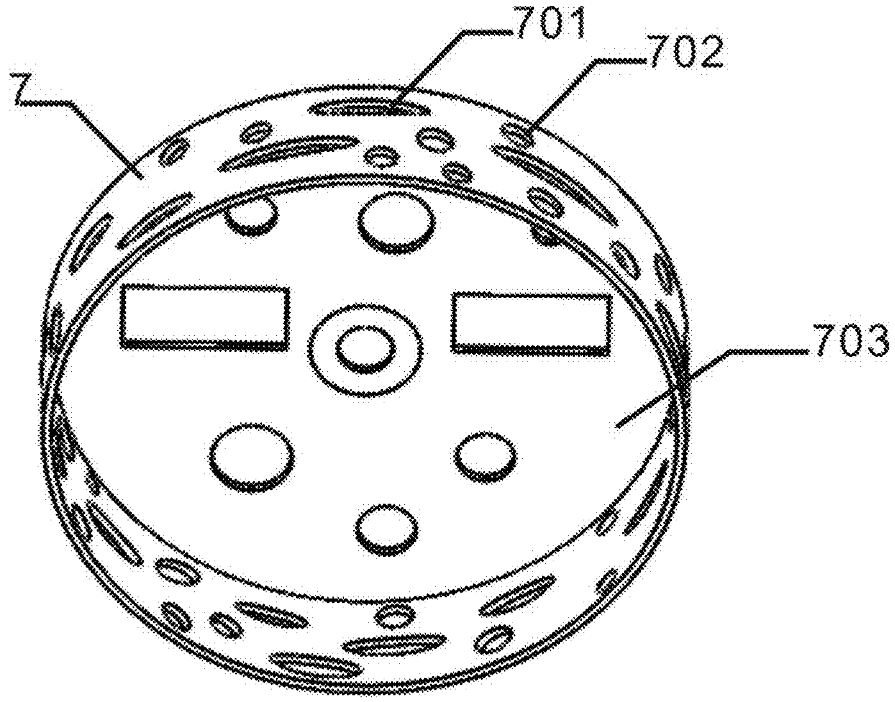
FIG. 7 is another view of the flashing dial of FIG. 5.
Figure 8:
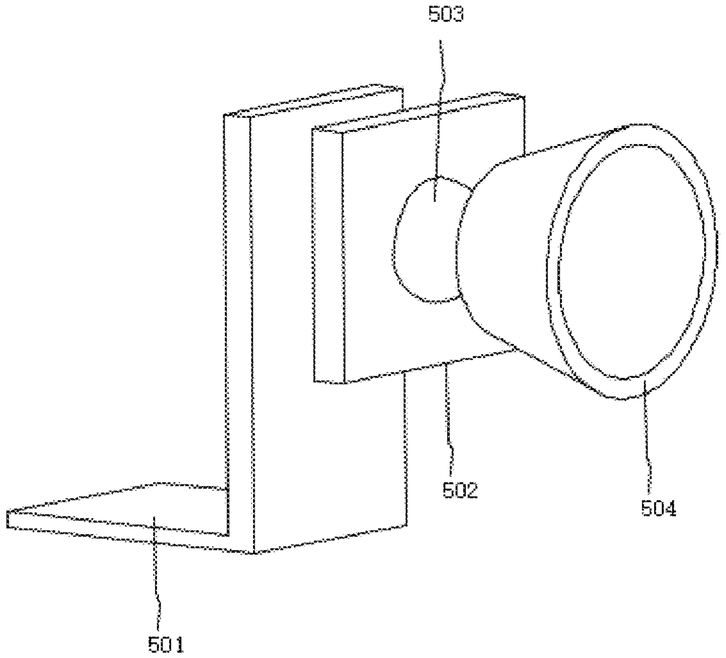
FIG. 8 is a schematic view of the starry light source assembly according to an embodiment of the present disclosure.

Referring to FIGS. 1-3, in one embodiment, the one or more starry light outlets 301 include a plurality of starry light outlets 301, for example four starry light outlets 301 are arranged on the front side wall of the surrounding wall group 3, and preferably, each of the starry light outlets 301 is spaced apart equal distance from adjacent starry light outlet 301. Light emitted from the starry light source assembly 5 transmit to outside through the starry light outlets 301 to create starry light in the sky.

In present embodiment, an optical fiber assembly is provided, which includes a plug 102 and a plurality of optical fibers 103 extending from the plug 102, the plug 102 can be plugged in one of the starry light outlets 301 to allow the light from the starry light outlet 301 transmit to outside through the plurality of optical fibers 103, therefore creating nebula and starry sky effect. It can be understood that, each of the starry light outlets 301 can be provided one optical fiber assembly to create more gorgeous and colorful sky scenes.

In present embodiment, the one or more meteor light outlets 302 include twelve meteor light outlets 302 arranged uniformly on the back wall of the surrounding wall group 3, light emitted from the meteor light source assembly 4 transmit to outside through the meteor light outlets 302 to create meteor light in the sky.

Referring to FIGS. 1-3 and 5-9, in one embodiment, the one or more starry light source assemblies 5 include four starry light source assemblies 5, and the four starry light source assemblies 5 are detachably mounted on the bottom 1 and face towards the respective four starry light outlets 301 (see FIG. 9). It can be understood that it can only have one starry light source assembly 5, and light emitted from the starry light source assembly 5 can transmit to outside through the four starry light outlets 301.

The rotating assembly 6 includes a motor 601 located on the bottom 1, an output shaft (as described below), and a connecting plate 602. The connecting plate 602 can be equipped with a positioning element 9 to fix the entire rotating component 6 to the bottom 1. The output shaft is located at the output end of the motor 601 and is rotatable. The output shaft faces upward to face the flashing dial 7. The flashing dial 7 is detachably connected to the top of the output shaft, and rotates around an axis perpendicular to the bottom plate 1 of the optical machine box. The height of the flashing dial 7 is less than its diameter, and its height is less than the height of the optical machine box.

In particular, the top of the output shaft is provided with a screw hole 603, the flashing dial 7 is a flat cylindrical object, and includes a peripheral side wall and a concave portion 703 (see FIG. 7) concaved from a bottom of the peripheral side wall along a height direction, the flashing dial 7 is provided a mounting plate 604 in the center of the concave portion 703, and the mounting plate 604 has a mounting hole, a screw 605 extending the mounting hole to be screwed in the screw hole 603, so as to fix the flashing dial 7 to the top end of the output shaft of the motor 601.

The flashing dial 7 has a plurality of holes 701, 702 formed in the peripheral side wall thereof, and the holes 701, 702 include different shapes and different sizes, and the concave portion 703 covers the one or more starry light source assemblies 5, light emitted from the one or more starry light source assemblies 5 can transmit through the holes 701, 702, and then transmit to outside from the starry light outlets 301.

The control circuit board 2 can control each of the four starry light source assemblies 5, and the four starry light source assemblies 5 can emit light in selected colors, for example, each of the starry light source assemblies 5 emits light in one color different from the other of the starry light source assemblies 5. When the motor 601 rotates, light emitted from the one or more starry light source assemblies 5 can transmit through the holes 701, 702 of the flashing dial 7, and then transmits outside through the starry light outlets 301; and due to the flashing dial 7 is in rotating, the light emitted from the one or more starry light source assemblies 5 can meet the peripheral side wall of the flashing dial 7, and meet the different shapes and different sizes of the holes 701, 702, so that it will create flickering light and dark effect when the flashing dial 7 rotates. This is similar to the flashing dial 7 rotates in a direction substantially parallel with the side wall of the surrounding wall group 3 provided with the plurality of starry light outlets 301, so that when the flashing dial 7 rotates, it will create a particular transverse light and dark effect by the change of the holes 701, 702 facing the starry light source assemblies 5.

Figure 10:
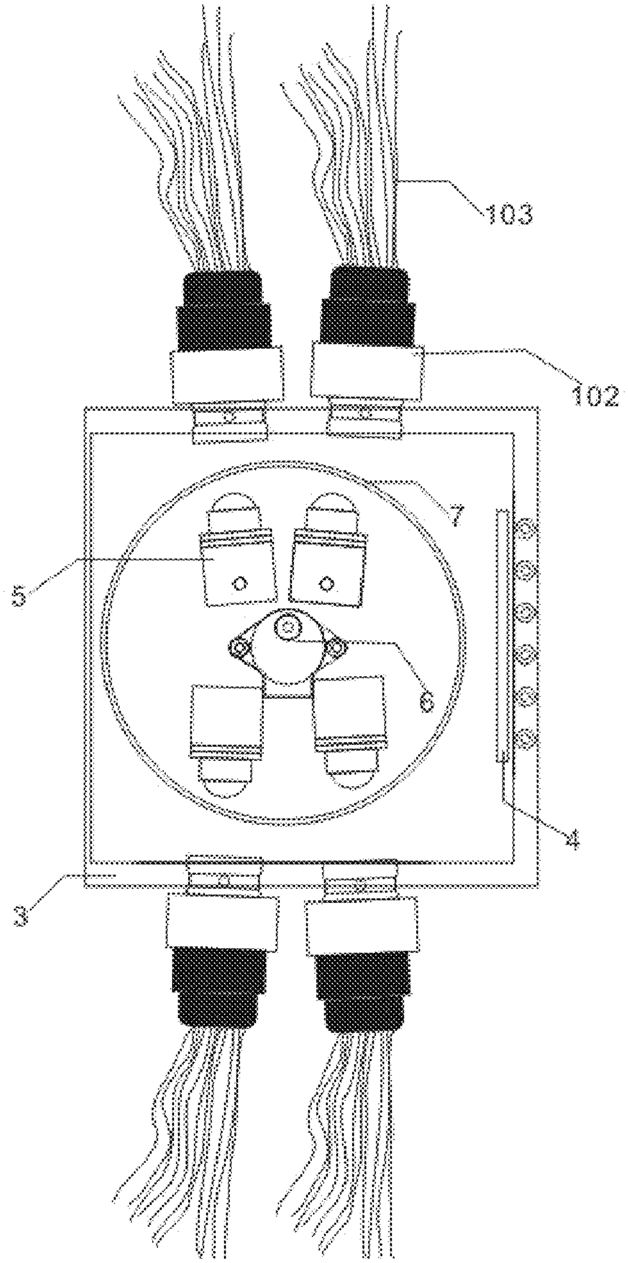
FIG. 10 is a schematic plan view showing another inner structures of the starry light source assembly after the cover is removed.

In an alternative embodiment, referring to FIG. 10, the one or more starry light outlets 301 comprises a plurality of starry light outlets 301, one or more of the plurality of starry light outlets 301 are provided on a first side wall of the surrounding wall group 3, the other one or more of the plurality of starry light outlets 301 are provided on an opposite second side wall of the surrounding wall group 3, the one or more meteor light outlets 302 are provided on a third side wall of the surrounding wall group 3, and the third side wall is perpendicular to the first side wall and the second sidewall.

It can be understood that the optical machine box can be in other shapes, and side walls of the surrounding wall group 3 can in different shapes.

Figure 11:
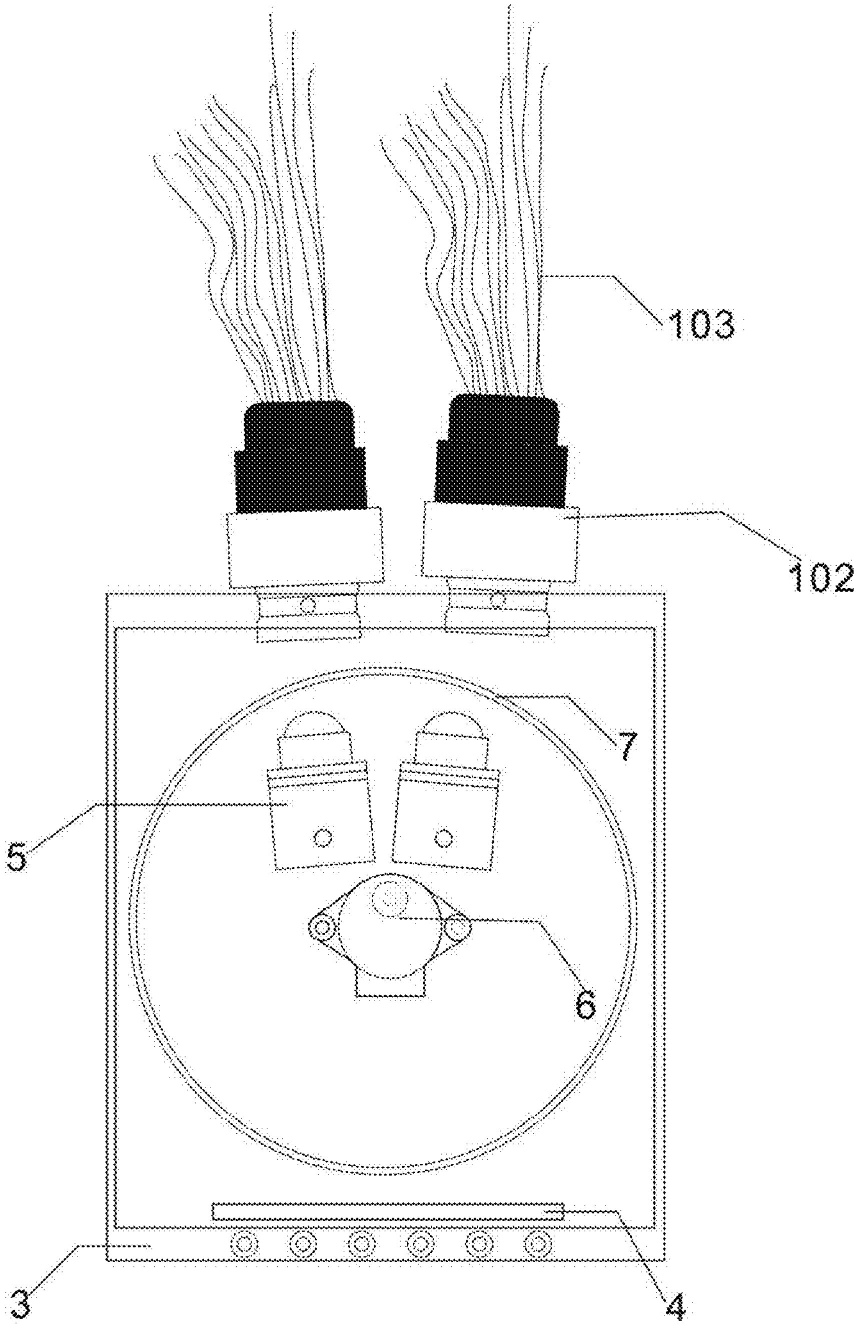
FIG. 11 is a schematic plan view of a starry sky light source assembly according to another embodiment of the present disclosure.

In another embodiment, referring to FIG. 11, the difference between this embodiment from the above embodiments is that the one or more starry light outlets 301 comprises two starry light outlets 301 provided on a first side wall of the surrounding wall group 3, and the one or more meteor light outlets 302 comprises a plurality of meteor light outlets 302 provided on a second side wall of the surrounding wall group 3, and the second side wall is opposite to the first side wall.

Figure 12:
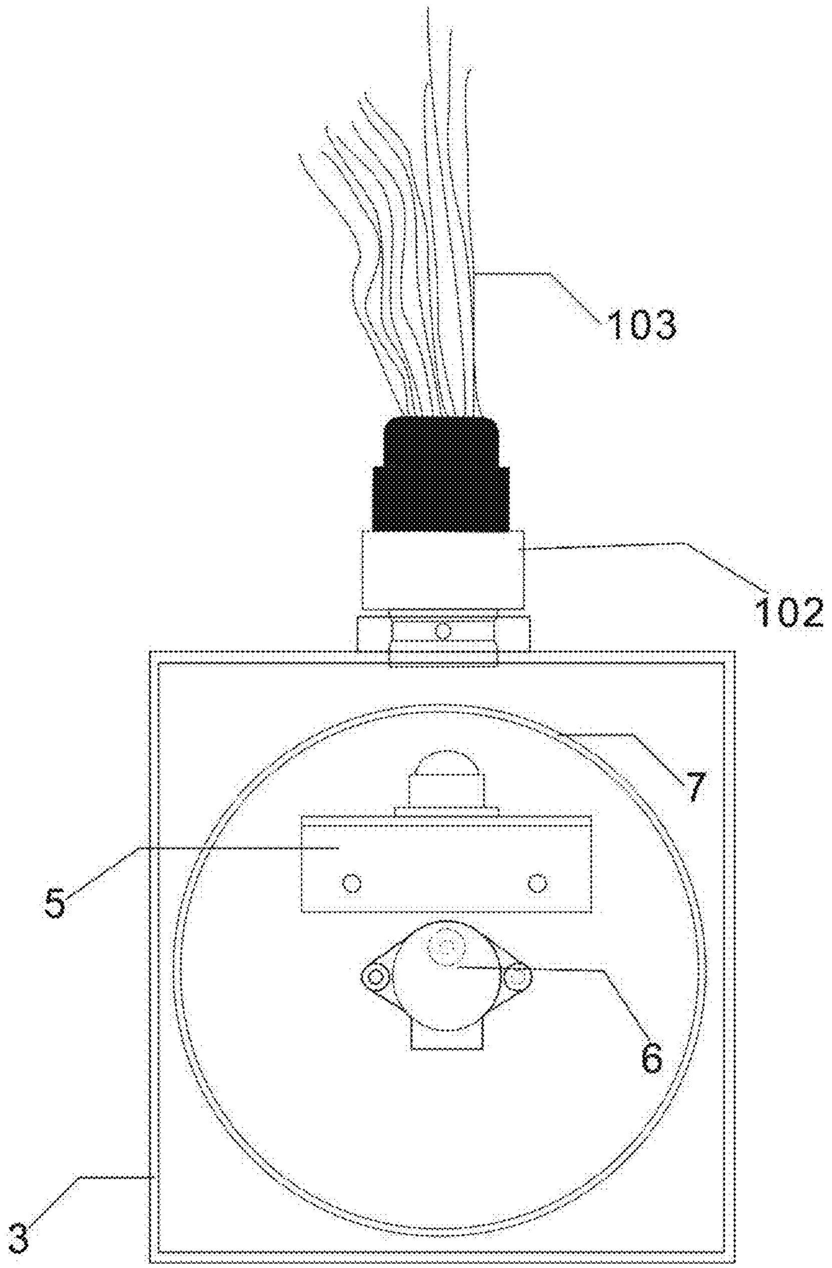
FIG. 12 is a schematic plan view of a starry sky light source assembly according to a further another embodiment of the present disclosure.

In further another embodiment, referring to FIG. 12, the difference between this embodiment from the above embodiments is that the one or more starry light outlets 301 comprises only one starry light outlet 301 provided on a first side wall of the surrounding wall group 3, and there is no meteor light outlets.

Concluded from the above, in the present invention, light emitted from the meteor light source assembly 4 transmit to outside through the meteor light outlets 302 to create meteor light in the sky; light emitted from the starry light source assembly 5 transmit to outside through the starry light outlets 301 to create starry light in the sky; the starry light source assemblies 5 can emit respective colors through control by the control circuit board 2, then when the motor 601 rotates, light transmits through the holes 701, 702 of different shapes and different sizes of the flashing dial 7, it creates flickering light and dark effect, by designing such starry sky light source assembly, the entire optical machine box can be reduced less than 35 mm.

Furthermore, the flashing dial 7 rotates around an axis perpendicular to the bottom 1 of the optical machine box, the flashing dial 7 is rotatably mounted with a height thereof being the minimum size direction, such that the height of the optical machine box can be reduced to be less than 35 mm, and the flashing dial 7 rotates in a direction substantially parallel with the side wall of the surrounding wall group 3 provided with the plurality of starry light outlets 301 to create a particular transverse light and dark effect. That is, the flashing dial rotates 7 around an axis perpendicular to the bottom of the optical machine box, viewed from the surrounding wall group 3, the flashing dial 7 likewise rotates transversely relative to the side walls of the surrounding wall group 3.

As the height of the body of the starry sky light source assembly with a flashing dial is less than 35 mm, so the starry sky light source assembly is a thin-type, allowing it to be installed on the roof of a car or other narrow spaces, this can reduce the distance between the starry sky light source assembly and the roof, decrease the amount of optical fiber used, and also reduce light attenuation.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A starry sky light source assembly, comprising:

an optical machine box comprising a bottom (1), a surrounding wall group (3) detachably mounted on the bottom (1), and a cover (8) detachably mounted on the surrounding wall group (3); the surrounding wall group (3) forming an inner space on the bottom (1), one or more starry light outlets (301) being provided on at least one side wall of the surrounding wall group (3), and the one or more starry light outlets (301) being in communication with the inner space;

a control circuit board (2) detachably mounted on the bottom (1) within the inner space;

one or more starry light source assemblies (5) detachably mounted within the inner space, and being electrically connected to the control circuit board (2);

a rotating assembly (6) electrically connected to the control circuit board (2) and being rotatable within the inner space; and a flashing dial (7) located in the inner space, connected to the rotating assembly (6) and being rotated by the rotating assembly (6);

wherein the starry sky light source assembly further comprises a meteor light source assembly (4) detachably mounted within the inner space, and being electrically connected to the control circuit board (2): wherein one or more meteor light outlets (302) are provided on another side wall of the surrounding wall group (3) and in communication with the inner space; and wherein the starry sky light source assembly further comprises an optical fiber assembly mounted in one of the starry light outlets (301) for transmitting light emitted from the one or more starry light source assemblies (5) to outside to create nebula and starry sky.

2. The starry sky light source assembly according to claim 1, wherein the optical machine box is less than 35 mm in height, and the bottom (1), the surrounding wall group (3) and the cover (8) are detachably mounted by screws.

3. The starry sky light source assembly according to claim 1, wherein the one or more starry light outlets (301) are provided on a first side wall of the surrounding wall group (3).

4. The starry sky light source assembly according to claim 1, wherein the one or more starry light outlets (301) comprises a plurality of starry light outlets (301), one or more of the plurality of starry light outlets (301) are provided on a first side wall of the surrounding wall group (3), another one or more of the plurality of starry light outlets (301) are provided on an opposite second side wall of the surrounding wall group (3).

5. The starry sky light source assembly according to claim 1, wherein the rotating assembly (6) comprises a motor (601), an output shaft and a connecting plate (602), and the flashing dial (7) is detachably mounted on an end (603) of the output shaft.

6. The starry sky light source assembly according to claim 5, wherein the flashing dial (7) is a flat cylindrical object, and comprises a peripheral side wall and a concave portion (703) concaved from a bottom of the peripheral side wall along a height direction thereof, and the flashing dial (7) is mounted on the end (603) of the output shaft.

7. The starry sky light source assembly according to claim 6, wherein a plurality of holes (701, 702) are formed in a peripheral side wall of the flashing dial (7), the holes (701, 702) are of different shapes and different sizes, when the flashing dial (7) is rotated, the holes (701, 702) create flickering light and dark.

8. The starry sky light source assembly according to claim 7, wherein the one or more starry light source assemblies (5) comprises a plurality of starry light source assemblies (5) mounted on the bottom (1) within the concave portion (703), and the starry light source assemblies (5) face the peripheral side wall of the flashing dial (7), light emitted from the starry light source assemblies (5) transmits through the holes (701, 702), and then transmits out from the starry light outlets (301).

9. The starry sky light source assembly according to claim 8, wherein the one or more starry light outlets (301) comprises a plurality of starry light outlets (301), and the plurality of starry light source assemblies (5) face towards the plurality of starry light outlets (301) respectively.

10. The starry sky light source assembly according to claim 1, wherein the flashing dial (7) rotates around an axis perpendicular to the bottom (1) of the optical machine box, viewed from the surrounding wall group (3), the flashing dial (7) rotates transversely relative to side walls of the surrounding wall group (3).

11. The starry sky light source assembly according to claim 1, wherein each starry light source assembly (5) comprises a holder (501), a starry light source panel (502) mounted on the holder (501), a light bulb (503) mounted on the starry light source panel (502), and an optical element (504) mounted outside of the light bulb (503).

12. A starry sky light source assembly, comprising:

an optical machine box comprising a bottom (1), a surrounding wall group (3) detachably mounted on the bottom (1), and a cover (8) detachably mounted on the surrounding wall group (3); a plurality of starry light outlets (301) being provided on at least one side wall of the surrounding wall group (3), and in communication with the inner space;

a control circuit board (2) detachably mounted on the bottom (1) within the optical machine box;

a starry light source assembly (5) detachably mounted within the optical machine box, and being electrically connected to the control circuit board (2);

a rotating assembly (6) electrically connected to the control circuit board (2) and being rotatable within the optical machine box; and a flashing dial (7) located in the optical machine box, connected to the rotating assembly (6) and being rotated by the rotating assembly (6), wherein the flashing dial (7) rotates around an axis perpendicular to the bottom (1) of the optical machine box.

13. The starry sky light source assembly according to claim 12, wherein the starry sky light source assembly further comprises a meteor light source assembly (4) detachably mounted within the inner space, and being electrically connected to the control circuit board (2), and a plurality of meteor light outlets (302) are provided on another side wall of the surrounding wall group (3) and in communication with the inner space.

14. The starry sky light source assembly according to claim 1, wherein the one or more starry light outlets (301) comprises a plurality of starry light outlets (301), the at least one side wall of the surrounding wall group (3) comprises a first side wall of the surrounding wall group (3), and the first side wall is curved in shape.

15. The starry sky light source assembly according to claim 12, wherein the at least one side wall of the surrounding wall group (3) is a curved side wall of the surrounding wall group (3).

* * * * *